United States Patent
Kuriiwa et al.

(10) Patent No.: US 7,335,430 B2
(45) Date of Patent: Feb. 26, 2008

(54) FUEL CELL SYSTEM

(75) Inventors: Takahiro Kuriiwa, Saitama (JP); Ryoji Takenawa, Saitama (JP); Hirokazu Kuwabara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 476 days.

(21) Appl. No.: 11/008,226

(22) Filed: Dec. 10, 2004

(65) Prior Publication Data

US 2005/0130002 A1 Jun. 16, 2005

(30) Foreign Application Priority Data

Dec. 11, 2003 (JP) ............................. 2003-412691

(51) Int. Cl.
*H01M 8/04* (2006.01)
*H01M 8/06* (2006.01)

(52) U.S. Cl. ............................. 429/12; 429/13; 429/26; 429/20; 429/17

(58) Field of Classification Search ................. 429/13, 429/26, 20, 17
See application file for complete search history.

(56) References Cited

U.S. PATENT DOCUMENTS 6,329,091 B1 * 12/2001 James ........................ 429/19
2002/0098396 A1 * 7/2002 Kobayashi et al. .......... 429/13

FOREIGN PATENT DOCUMENTS

| JP | 07-094202 | 4/1995 |
| JP | 10-144333 | 5/1998 |
| JP | 2001-118593 | 4/2001 |
| JP | 2002-222658 | 8/2002 |

OTHER PUBLICATIONS

International Publication No. WO 97/48142, published Dec. 18, 1997.

* cited by examiner

*Primary Examiner*—Tracy Dove
*Assistant Examiner*—Helen Chu
(74) *Attorney, Agent, or Firm*—Arent Fox LLP.

(57) ABSTRACT

A fuel cell system having a fuel cell consuming the hydrogen stored in the high-pressure hydrogen tank as fuel gas, a hydrogen supply line connecting the high-pressure hydrogen tank to the fuel cell, a primary decompressing means provided on the hydrogen supply line, a secondary decompressing means provided in the downstream side of the primary decompressing means on the hydrogen supply line, a hydrogen storage alloy tank saving a hydrogen storage alloy and thermal-exchangeably connected to the fuel cell, a hydrogen pipe connected between the primary decompressing means and the secondary decompressing means, and supplied for hydrogen transfer between the hydrogen supply line and the hydrogen storage alloy tank is provided, and a controlling means for introducing the hydrogen of the first prescribed pressure into the hydrogen storage alloy tank from the hydrogen supply line through the hydrogen pipe during the warm-up of the fuel cell.

11 Claims, 9 Drawing Sheets

FUEL CELL SYSTEM

BACKGROUND OF THE INVENTION

1. Field of the Invention

The present invention relates to a low temperature start of a fuel cell, and more particularly, a fuel cell system for warming up using a hydrogen storage alloy.

2. Description of Relevant Art

Attention in recent years has been focused on a fuel cell electric vehicle (FCEV) from a perspective of suppressing a discharge amount of carbon dioxide that is a cause of global warming. A fuel cell (FC) reacting hydrogen ($H_2$) with oxygen ($O_2$) in air electrochemically to generate electricity is mounted in the fuel cell electric vehicle. Electricity generated by the fuel cell is supplied to a travel motor, and driving force is generated.

Moreover, the temperature where the fuel cell realizes the maximum performance is decided. For example, in a proton exchange membrane (PEM) type fuel cell for which attention has been focused as a power plant of the fuel cell electric vehicle, the temperature is about 80° C., and if the temperature is low, the power generation performance (electromotive force) is reduced. Thereby, when the fuel cell electric vehicle is started in winter or in a cold district, it is necessary to warm up the fuel cell (that is, heat or warm the fuel cell to a prescribed temperature).

Conventionally, the fuel cell has been warmed up by the following methods.

(1) Warm-up due to an electric heater; An electric heater is made to generate heat by a power supply provided in a battery mounted in the fuel cell electric vehicle and in a garage or the like, and the fuel cell is warmed up by the heat (for example, Japanese Unexamined Patent Publication No. H7-94202).

(2) Warm-up due to a hydrogen combustor; Hydrogen, methanol and gasoline or the like mounted in the fuel cell electric vehicle as fuel (raw fuel) are supplied to a catalytic combustor or the like and burned. A fuel cell is warmed up by the combustion heat (for example, Japanese Unexamined Patent Publication No. 2001-118593).

(3) Warm-up due to self-heat generation of a fuel cell; When the power generation of the fuel cell is started, the fuel cell is warmed up by using heat generation (so called self-heat generation) due to the electrochemical reaction of hydrogen and oxygen (for example, Japanese Translation of International Application No. 2000-512068, equivalent to WO97/48142).

(4) Other warm-up; A fuel cell is warmed up by a thermal storage agent or an exothermic agent (for example, Japanese Unexamined Patent Publication No. H10-144333).

On the other hand, the applicant has focused attention on a hydrogen storage alloy that generates heat when the hydrogen storage alloy absorbs hydrogen, and the heat generated in this case can be used for the warm-up of hydrogen consumption apparatuses including the fuel cell, and a hydrogen storage alloy capable of being repeatedly used. The applicant has conventionally proposed a technique that a hydrogen storage alloy tank for warm-up is attached to a fuel cell system and the fuel cell is warmed up by the heat generated by introducing the hydrogen into the hydrogen storage alloy tank (Japanese Unexamined Patent Publication No. 2002-222658).

In this fuel cell system, a primary regulator and a secondary regulator are arranged in order to decompress between a high-pressure hydrogen tank and the fuel cell in two steps. The hydrogen extracted from between the primary regulator and the secondary regulator is introduced into the hydrogen storage alloy tank, and the fuel cell is warmed up by heating a cooling liquid of the fuel cell by the heat discharged from the hydrogen storage alloy. After the warm-up operation, the hydrogen is discharged from the hydrogen storage alloy by heating the hydrogen storage alloy tank using the cooling liquid of the fuel cell heated. Electricity is generated by making the hydrogen attract to the fuel cell from the downstream side of the secondary regulator, and the hydrogen storage alloy arranged in the hydrogen storage alloy tank is simultaneously reproduced.

However, it is not preferable that a battery is consumed in the warm-up due to the electric heater of (1). Electricity may not be sufficiently supplied from the battery at a low temperature. When the power supply is used, the fuel cell cannot be warmed up at a position where power supply is not available such as on a road. It is not preferable that the fuel cell consumes fuel (raw fuel) which should be used for power generation in the warm-up due to the hydrogen combustor of (2) or the like. In the warm-up due to the self-heat generation of the fuel cell of (3), the fuel cell cannot be warmed up in the situation in which the fuel cell cannot generate electricity. It is not preferable that the fuel (raw fuel) is consumed for warm-up. In the case of the thermal storage agent or the exothermic agent of (4), it is difficult to take out heat when required, or it is difficult to use the thermal storage agent and the exothermic agent repeatedly. That is, in the prior art, energy is required only for warm-up, and energy which should be used for power generation is wastefully consumed. Since a dedicated heater and a dedicated hydrogen combustor or the like which can be used only for warm-up, or a dedicated thermal storage agent and a dedicated exothermic agent or the like are used, a problem exists in that the fuel cell system is enlarged. Although it is necessary to warm up quickly, in order to satisfy this demand, further consumption of energy and a large-sized warm-up device are needed. The warm-up must be able to be easily performed by a simple configuration.

On the other hand, since the fuel cell system described in JP unexamined patent publication No.2002-22258 uses the hydrogen used for warm-up as the fuel of the fuel cell after the warm-up operation, the fuel cell system is different from a warm-up method due to the electric heater and the hydrogen combustor or the like, and has no problem with consumption of electric energy and hydrogen fuel. Also, the fuel cell system generates heat very quickly when the hydrogen storage alloy absorbs the hydrogen, and can be promptly warmed up. In addition, the fuel cell system can be warmed up regardless of situations such as outside air temperature in a comparatively small device.

However, since the hydrogen from the hydrogen storage alloy tank is discharged to the downstream side of the secondary regulator while the hydrogen is introduced to the hydrogen storage alloy tank from between the primary regulator and the secondary regulators in the fuel cell system, the following problem has existed. That is, since the number of apparatuses such as a solenoid valve provided in pipes connected to the hydrogen storage alloy tank or in the pipelines thereof is increased, the configuration of the device becomes complicated, and the cost of manufacturing is also increased. Although the supply amount of the hydrogen to the fuel cell is controlled by the adjusting pressure of the secondary regulator, since the hydrogen flows to the downstream side of the secondary regulator from the hydrogen storage alloy tank, it is not avoided that the hydrogen serves as a disturbance and the control becomes complicated, or the power generation state of the fuel cell becomes unstable.

Therefore, there is a desire of a fuel cell system which has a simple configuration and realizes the efficient warm-up of the fuel cell without causing problems described above.

SUMMARY OF THE INVENTION

A fuel cell system of the present invention comprises: a high-pressure hydrogen tank storing high pressure hydrogen; a fuel cell consuming the hydrogen stored in the high-pressure hydrogen tank as fuel gas; a hydrogen supply line connecting the high-pressure hydrogen tank to the fuel cell; a primary decompressing means provided on the hydrogen supply line and decompressing the hydrogen to a first prescribed pressure; a secondary decompressing means provided in the downstream side of the primary decompressing means on the hydrogen supply line, and decompressing the hydrogen decompressed to the first prescribed pressure to a second prescribed pressure; a hydrogen storage alloy tank saving a hydrogen storage alloy and thermal-exchangeably connected to the fuel cell; and a hydrogen pipe connected between the primary decompressing means and the secondary decompressing means on the hydrogen supply line and supplied for hydrogen transportation between the hydrogen supply line and the hydrogen storage alloy tank.

In the fuel cell system, the hydrogen of the first prescribed pressure is introduced into the hydrogen storage alloy tank from the hydrogen supply line through the hydrogen pipe during the warm-up of the fuel cell, and hydrogen of higher pressure than the first prescribed pressure is released to the hydrogen supply line from the hydrogen storage alloy tank through the hydrogen pipe after the warm up of the fuel cell.

In this fuel cell system, when an actuation command is inputted, the hydrogen is introduced into the hydrogen storage alloy tank. Accordingly, the temperature of the hydrogen storage alloy tank is increased by the heat generated when the hydrogen storage alloy absorbs the hydrogen, and the fuel cell is warmed up by performing a thermal conversion between the hydrogen storage alloy tank and the fuel cell. When the fuel cell is warmed up to temperature where the fuel cell can be operated (power generation), the introduction of the hydrogen to the hydrogen storage alloy tank is stopped, and the operation is started by supplying the hydrogen to the fuel cell. When the temperature of the fuel cell is fully increased by the operation, the temperature in the hydrogen storage alloy tank is increased by heat accompanying the operation of the fuel cell. Thereby, the hydrogen storage alloy releases the hydrogen and the reproduction of the hydrogen is performed.

In the fuel cell system, the heat exchange between the hydrogen storage alloy tank and the fuel cell is preferably carried out through a cooling liquid supplied for the cooling of the fuel cell.

In this case, the cooling liquid circulates through both the hydrogen storage alloy tank and the fuel cell, the heat is supplied to the lower temperature from the higher temperature.

In the fuel cell system, the warm up of the fuel cell is preferably carried out when the temperature of the fuel cell is below a prescribed temperature.

In this case, for example, when an ignition switch is in the ON state at a low temperature where the fuel cell cannot be generated, the hydrogen is first absorbed by the hydrogen storage alloy provided in the hydrogen storage alloy tank. After the fuel cell is warmed up by the heat generated when the hydrogen is absorbed, the operation of the fuel cell can be started.

In the above fuel cell system, the fuel cell is warmed up by using the heat generated when the hydrogen used as the fuel of the fuel cell is absorbed to the hydrogen storage alloy. Therefore, it is not necessary to prepare special energy for warm-up, and the configuration of the fuel cell system is also simple. In addition, since the hydrogen storage alloy can repeat the absorption/discharge of the hydrogen reversibly, the fuel cell can be warmed up any number of times, and the fuel cell can be started at a low temperature. Since there is no overshoot when generating heat, the fuel cell can be easily warmed up, and the handling is also easy. The hydrogen storage alloy is promptly reproduced after the warm-up operation, and the next warm-up can be performed. Since the hydrogen after warm-up operation flows back through the hydrogen pipe between the primary decompressing means and secondary decompressing means in the hydrogen supply line, the hydrogen supply control to the fuel cell does not become complicated.

Since the fuel cell is warmed up by using the cooling water of the cooling system that the fuel cell system has in the above fuel cell system as a heat medium, the configuration of the warm-up system can be drastically simplified. When the warm-up is required, the fuel cell can be warmed up on the basis of the temperature of the fuel cell.

DETAILED DESCRIPTION OF THE PREFERRED EMBODIMENT

Hereinafter, the embodiment of the present invention will be explained in detail with reference to the drawings.

<Principle>

First, a principle for warming up the fuel cell by using the present invention will be explained.

Figure 1:
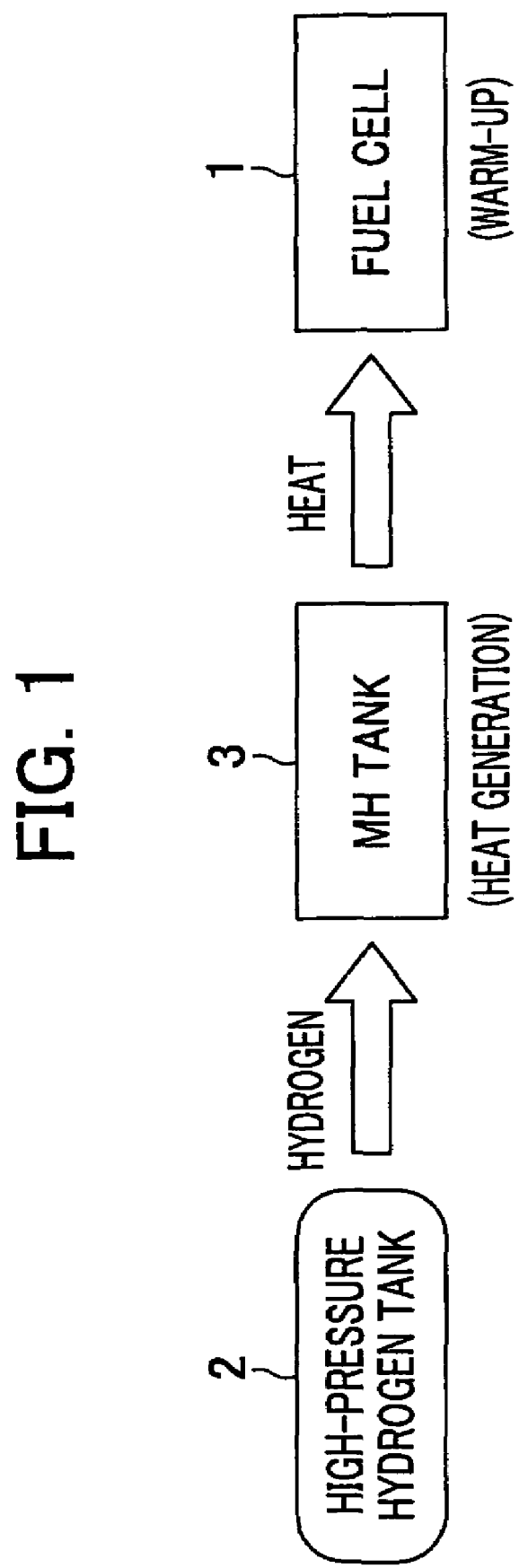
FIG. 1 is a diagram for explaining a warm-up principle according to the present invention.
Figure 2:
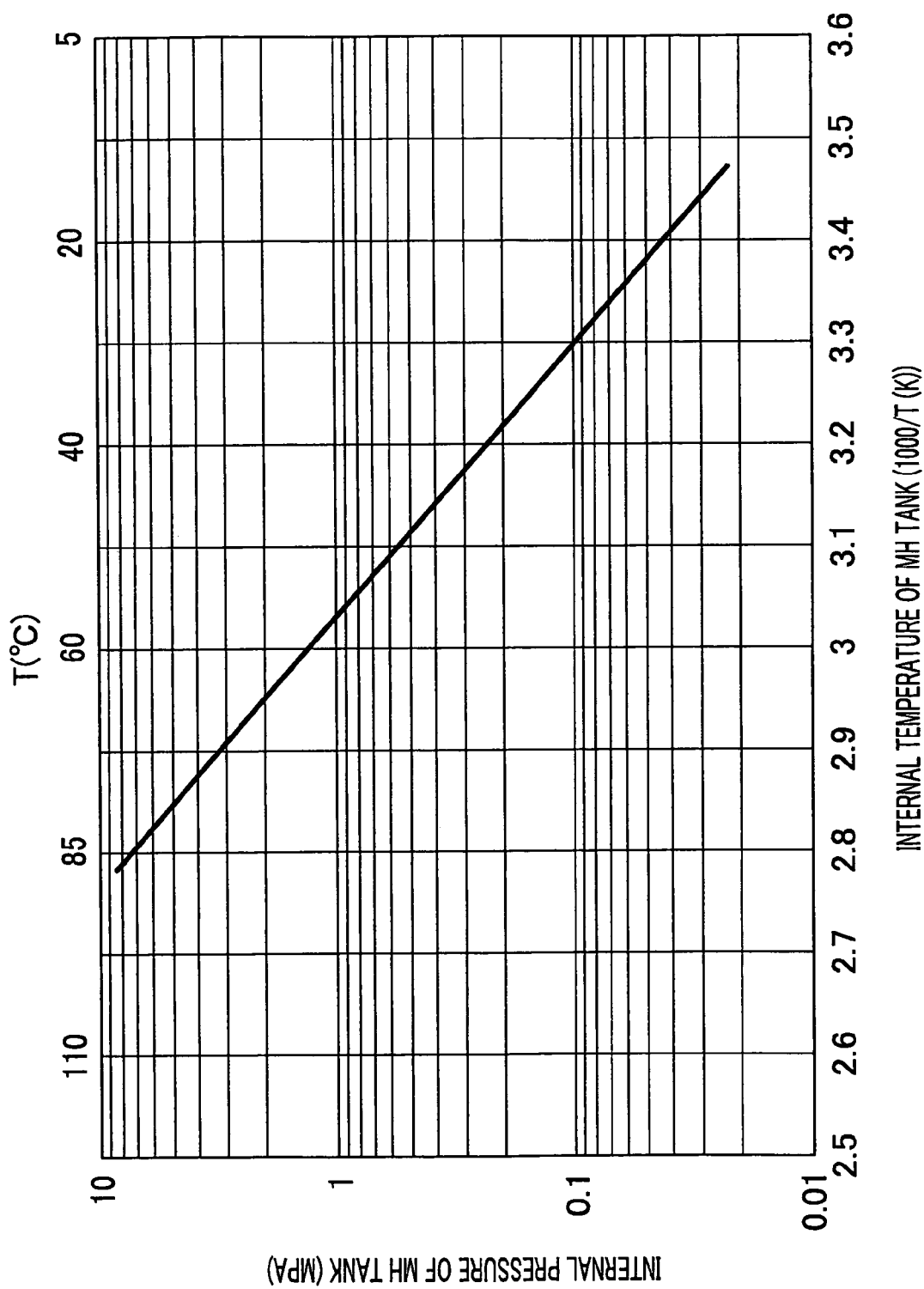
FIG. 2 is an internal temperature-pressure characteristic diagram of an MH tank as an example.
Figure 3:
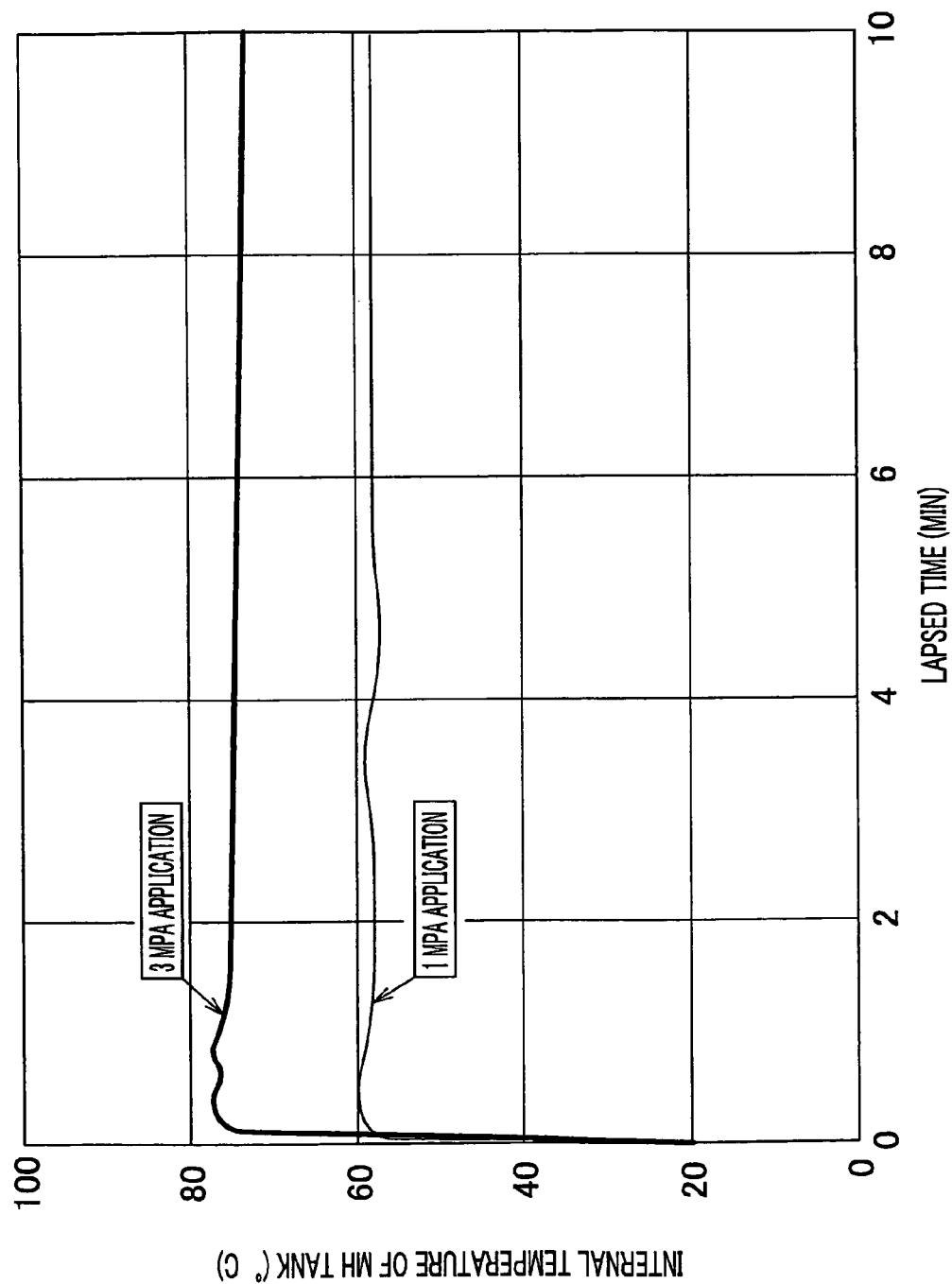
FIG. 3 is a time chart in which the changing state of the internal temperature of the MH tank by the pressure of hydrogen applied to the MH tank is plotted.

FIG. 1 is a diagram for explaining a warm-up principle. FIG. 2 is an internal temperature-pressure (internal pressure) characteristic diagram of an MH (Metal Hydride: hydrogen storage alloy) tank as an example. FIG. 3 is a time chart in which the changing state of the internal temperature of the MH tank by the pressure of hydrogen applied to the MH tank is plotted. The indication of the centigrade temperature shown in FIG. 2 is used as a target for making it easy to understand the temperature indication (temperature indication due to Arrhenius plot) due to 1000/T (K).

Numeral 1 shown in FIG. 1 is a fuel cell as an object of warm-up. Numeral 2 is a high-pressure hydrogen tank for storing hydrogen at high pressure (for example, about 35 MPa), and the tank has a pressure-proof airtight structure. Numeral 3 is an MH tank incorporating a hydrogen storage alloy, and the MH tank has a pressure-proof airtight structure. The MH tank 3 receives supply of the hydrogen from the high-pressure hydrogen tank 2. The internal pressure of the MH tank 3 before warm-up operation is about 0.1 MPa (atmospheric pressure), and the MH tank 3 is in a state capable of absorbing the hydrogen.

The hydrogen is supplied to the MH tank 3 from the high-pressure hydrogen tank 2 at the starting of the fuel cell 1. Then, the internal pressure of the MH tank 3 is increased. The hydrogen storage alloy incorporated in the MH tank 3 absorbs the hydrogen at the same time to generate heat, and the internal temperature of the MH tank 3 is increased. In this case, the relationship between the internal pressure and internal temperature of the MH tank 3 depends on an internal temperature-pressure characteristic diagram shown in FIG. 2. As shown in FIG. 3, when the pressure of the hydrogen stored in the MH tank 3 is set to 1 Mpa, the internal temperature of the MH tank 3 becomes nearly 58° C. When the pressure of the hydrogen stored in the MH tank 3 is set to 3 MPa, the internal temperature becomes nearly 75° C.

The generated heat is transmitted to the fuel cell 1 from the MH tank 3 by a suitable heat transfer means, and the fuel cell 1 is warmed up. The heat can be transmitted to the fuel cell 1 by transfer, radiation and convection or the like. The heat can be transmitted by direct heating or indirect heating.

As shown in FIG. 3, when the pressure is applied, the internal temperature of the MH tank 3 is rapidly increased, and the highest temperature is recorded. The temperature is then not increased, and an approximately constant temperature is maintained (while the temperature is maintained, the hydrogen storage alloy absorbs the hydrogen continuously). The hydrogen storage alloy generates heat as a whole volume (whole mass). Thereby, if the MH tank 3 is considered to be so to speak a hydrogen absorption heat type heater (MH heater), the MH heater is different from a combustion heater or an electric formula heater, and has no overshoot at the time of heating. In addition, the MH tank 3 has a characteristic for reaching the highest temperature in an extremely short time. Therefore, the handling of the MH heater is very easy, and the MH heater can warm up promptly. The temperature can be controlled by the pressure to be applied, see FIG. 2, FIG. 3 easily. Therefore, the handling is very easy from this respect. The amount of heat generated is proportional to the kind and amount of the hydrogen storage alloy incorporated in the MH tank 3.

In this way, FIG. 2 also shows the temperature-pressure characteristic of a (BCC (Body Centered Cubic) system) hydrogen storage alloy (In the case of the BCC system hydrogen storage alloy, if the internal pressure of the MH tank 3 is set to 3 MPa, the hydrogen of about 2.4 g (about 1.2 mol) per the hydrogen storage alloy of 100 g is absorbed). When the calorific value is about 15 kJ/g hydrogen, that is, the BCC system hydrogen storage alloy absorbs the hydrogen of 1 g, the heat of 15 kJ(s) is generated. As the hydrogen storage alloy, for example, the following can be used.

$AB_2$ type alloy (laves phase alloy); $TiCr_2$, $(Zr, Ti)$ $(Ni, Mn, V, Fe)_2$ . . .
$AB_5$ type alloy; $LaNi_5$, $MnNi_5$ . . .
BCC system alloy; Ti—V—Cr, Ti The hydrogen storage alloy can absorb/discharge the hydrogen reversibly. Thereby, the hydrogen absorbed to the hydrogen storage alloy can be used as the fuel of the fuel cell 1. The hydrogen storage alloy can absorb the hydrogen once again if hydrogen storage alloy discharges the hydrogen. Of course, the heat is generated when the hydrogen is absorbed once again.

Next, the embodiment applying the fuel cell system of the invention to the fuel cell electric vehicle (hereinafter referred to as "vehicle") will be explained.

Embodiment

Configuration of Embodiment

In the embodiment to be described below, electricity is generated by supplying the hydrogen to the fuel cell while the fuel cell is warmed up by the heat generated when the hydrogen is absorbed by the hydrogen storage alloy.

First, a vehicle will be explained. In the vehicle V shown in FIG. 4, a FC box FCB is mounted underneath the floor of a passenger's seat. In the FC box FCB, a fuel cell 10 (see FIG. 5) is stored. A travel motor M is mounted in the front part of the vehicle V. A high-pressure hydrogen tank 21 and an MH tank 31 are mounted in a horizontal state above the rear wheel of the vehicle V. The heat generated by the MH tank 31 warms up the fuel cell 10 using a cooling liquid flowing through a primary cooling system pipe of the fuel cell 10 (not shown) The fuel cell 10 is connected to the high-pressure hydrogen tank 21 and the MH tank 31 through a hydrogen supply line (not shown).

The fuel cell 10 is connected to an air compressor by an air supply pipe (not shown). The fuel cell 10 reacts oxygen in air with hydrogen electrochemically to generate electricity. The generated electricity is supplied to the travel motor M. Thereby, the vehicle V is traveled by the driving force of the motor M. In this way, herein, the fuel cell 10 is a PEM type fuel cell which is a solid polymer type, and the fuel cell 10 has a laminating structure obtained by further laminating single cells of about 300 sheets which hold a membrane electrode structure (MEA) composed by an anode electrode and a cathode electrode or the like by means of laminating an electrolytic membrane, using a separator (not shown). The PEM is an abbreviation for Proton Exchange Membrane, and MEA is an abbreviation for Membrane Electrode Assembly.

Figure 5:
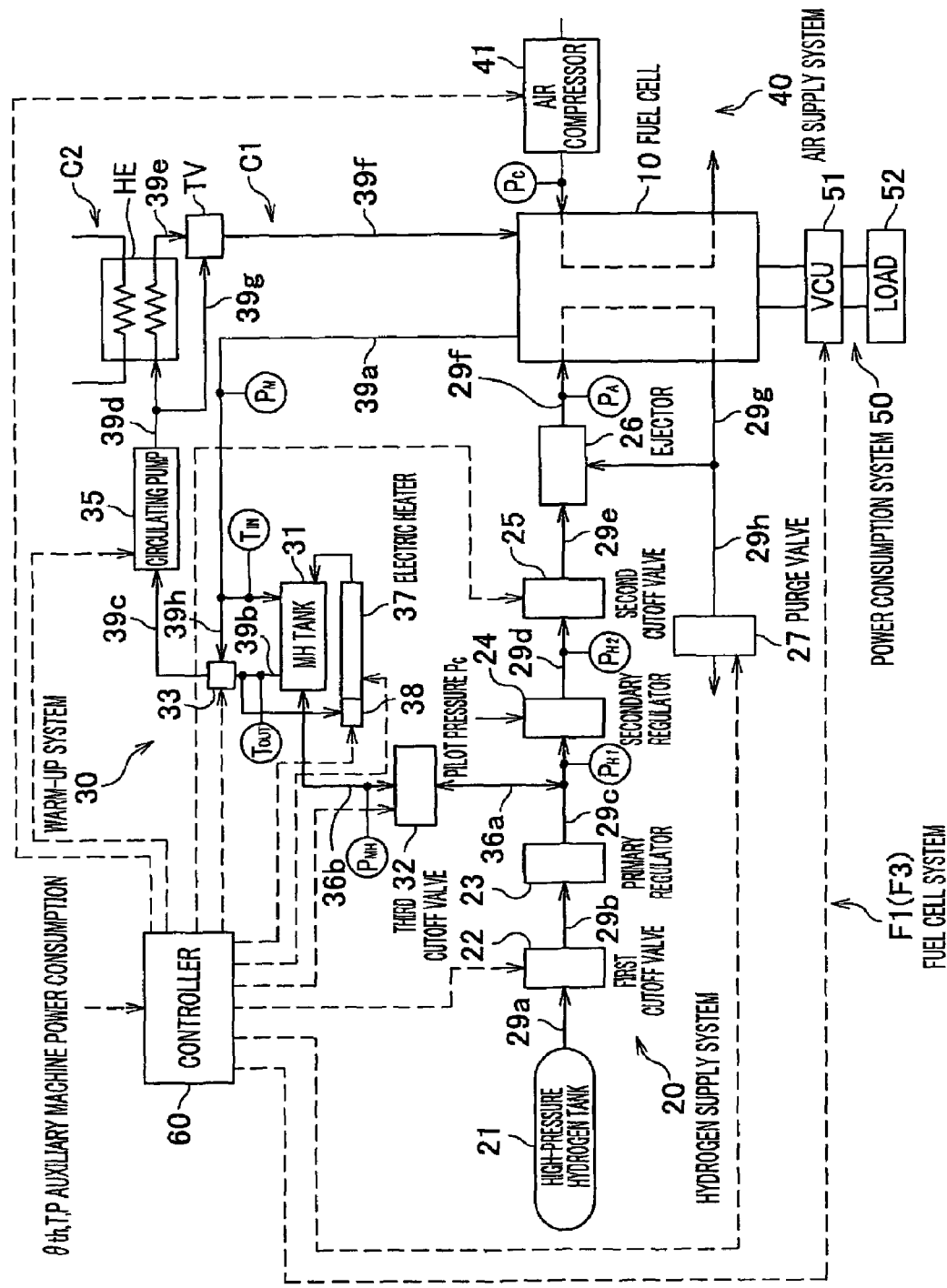
FIG. 5 is a block configuration diagram of the fuel cell system of the embodiment according to the present invention.

Next, a fuel cell system F1 will be explained with reference to FIG. 5. The fuel cell system F1 of the embodiment contains the fuel cell 10, a hydrogen supply system 20, a warm-up system 30, an air supply system 40, a power consumption system 50 and a controller 60.

The fuel cell 10 is a PEM type fuel cell as described above, and electricity is generated by supplying hydrogen as fuel gas and air as oxidizing agent gas. The electricity generated by the fuel cell 10 is taken out through a VCU (Voltage Control Unite) 51. The VCU 51 is a voltage regulator having a limiting function, and restricts the current taken out from the fuel cell 10. The current taken out through the VCU 51 is supplied to a load 52 such as the travel motor M (see FIG. 4) and an auxiliary machine. The current amount taken out by the VCU 51 is set based on the treading amount θth of a throttle pedal (not shown) and the power consumption of the auxiliary machine or the like.

The hydrogen supply system 20 plays the role of supplying hydrogen as fuel gas to the fuel cell 10. Therefore, a first cutoff valve 22, a primary regulator (primary decompressing means) 23, a secondary regulator (secondary decompressing means) 24, a second cutoff valve 25 and an ejector 26 besides the high-pressure hydrogen tank 21 are set in the upstream side of the fuel cell 10. A purge valve 27 is set in the downstream side of the fuel cell 10. The apparatuses (from the high-pressure hydrogen tank 21 to the fuel cell 10) are connected by fuel pipes (hydrogen supply lines) 29a to 29f, and the hydrogen from the high-pressure hydrogen tank 21 is supplied to the fuel cell 10 (anode electrode) through the first cutoff valve 22, the primary regulator 23, the secondary regulator 24, the second cutoff valve 25 and the ejector 26. The gas (hereinafter referred to as "discharge hydrogen") discharged from the fuel cell 10 (anode electrode) returns to the ejector 26 through the fuel pipe 29g, and is again introduced (re-circulated) into the fuel cell 10. The discharge hydrogen in which impurity concentration becomes high by re-circulation for a long time is discharged outside of the hydrogen supply system 20 through the fuel pipe 29h and the purge valve 27.

The high-pressure hydrogen tank 21 is a lightweight tank made of a carbon fiber reinforced plastic (CFRP) or the like, and pressure tightness and airtightness are secured. For example, the high-pressure hydrogen tank 21 is filled with hydrogen at a maximum pressure of 35 Mpa. In the embodiment, the high-pressure hydrogen tank 21 also plays the role of the fuel tank.

The first cutoff valve 22 is an electromagnetically driven ON-OFF valve. The first cutoff valve 22 is opened and closed based on the signal from the controller 60, and the circulation of the hydrogen supplied from the high-pressure hydrogen tank 21 in the closed condition is cut off. On the other hand, the hydrogen supplied from the high-pressure hydrogen tank 21 is supplied in the downstream side in the opened condition.

The primary regulator 23 is a decompressing valve for decompressing the hydrogen supplied from the high-pressure hydrogen tank 21 and adjusting to a first prescribed pressure (for example, 1 MPa: hereinafter, described as "first adjusting pressure $P_{H1}$"). The secondary regulator 24 is a decompressing valve for decompressing further the hydrogen decompressed by the primary regulator 23 and adjusting to a second prescribed pressure (for example, 0 to 0.5 MPa: hereinafter, described as "second adjusting pressure $P_{H2}$"). In the secondary regulator 24, an inlet pressure $P_c$ of a cathode electrode is a pilot pressure (see FIG. 5), and is operated such that the stress which acts on MEA that is differential pressure between the anode electrode and the cathode electrode becomes small. The first adjusting pressure $P_{H1}$ and the second adjusting pressure $P_{H2}$ are detected by pressure sensors $P_{H1}$, $P_{H2}$ corresponding respectively, and the detected signals are transmitted to the controller 60.

The second cutoff valve 25 is an electromagnetically driven ON-OFF valve. The second cutoff valve 25 is opened and closed based on the signal from the controller 60, and in the closed condition, the circulation of the hydrogen to the fuel cell 10 is intercepted in the upstream side of the ejector 26.

The ejector 26 supplies the hydrogen supplied from the secondary regulator 24 to the anode electrode of the fuel cell 10. The ejector 26 plays the role of a hydrogen circulating pump for attracting and re-circulating gas after being used as fuel gas, that is, the discharge hydrogen discharged from the anode electrode of the fuel cell 10 by using the flow of the hydrogen moving toward the anode electrode. The fuel consumption of the fuel cell system is improved by re-circulating the discharge hydrogen.

The purge valve 27 is an electromagnetically driven ON-OFF valve. The purge valve 27 is opened and closed based on the signal from the controller 60, makes the discharge hydrogen move toward the ejector 26 in the closed condition, and discharges the discharge hydrogen to the outside of the system in the opened condition.

In the hydrogen supply system 20, the pressure (the pressure at the anode electrode inlet) $P_A$ of the anode electrode of the fuel cell 10 is detected by a pressure sensor $P_A$. On the other hand, the pressure (the pressure at the cathode electrode inlet) $P_C$ of the cathode electrode is detected by a pressure sensor $P_C$, and the detected signals are transmitted to the controller 60.

The warm-up system 30 plays the role of supplying the heat generated by the MH tank 31 to the fuel cell 10 to warm up the fuel cell 10. The warm-up system 30 comprises a third cutoff valve 32, a three-way solenoid valve 33, a circulating pump 35, hydrogen pipes 36a, 36b, an electric heater (heating means) 37, an auxiliary pump 38 and a cooling liquid pipes 39a to 39h besides the MH tank 31. The warm-up system 30 of the embodiment uses the primary cooling system C1 of the fuel cell 10. In the primary cooling system C1, the heat generated by the fuel cell 10 due to power generation is also discharged to the outside of the system through the warm-up system 30, and the fuel cell 10 is cooled (a prescribed temperature is maintained).

The warm-up system 30 has a system (warm-up hydrogen system) in which hydrogen circulates, a system (warm-up cooling liquid system) in which the cooling liquid of the fuel cell 10 circulates and a system (reproduction heating system) heating the MH tank 31. The warm-up hydrogen system comprises the MH tank 31, the third cutoff valve 32, and the hydrogen pipes 36a, 36b. On the other hand, the warm-up cooling system comprises the MH tank 31 (a jacket part to be described below), the three-way solenoid valve 33, the circulating pump 35, the fuel cell 10, a heat exchanger HE of a primary cooling system C1 of the fuel cell 10, a thermostat valve TV and cooling liquid pipes 39a to 39h for connecting these. The reproduction heating system comprises the electric heater 37 and the auxiliary pump 38. Numeral C2 is a secondary cooling system. Hereinafter, a main apparatus constituting the warm-up system 30 will be explained.

The MH tank 31 is a pressure-proof airtight tank made of an aluminum alloy having higher heat resistance than a tank made of resin and having a high heat conductivity as a material, and the inside thereof is filled up with the hydrogen storage alloy. For example, the MH tank 31 can absorb the hydrogen at the maximum pressure of 3 to 5 MPa. The outside of the MH tank 31 is covered with a water cooled jacket, and the cooling liquid of the fuel cell 10 flows through the inside of a jacket. Therefore, the heat generated when the hydrogen storage alloy absorbs the hydrogen is transmitted to the cooling liquid of the fuel cell 10, and the cooling liquid circulates through the fuel cell 10. Thereby, the fuel cell 10 is warmed up. In this way, the packed amount (proportional to the internal volume of the MH tank 31) of the hydrogen storage alloy is set based on the heat amount needed for warm-up.

The third cutoff valve 32 is an electromagnetically driven ON-OFF valve. The third cutoff valve 32 is opened and closed based on the signal from the controller 60. In the closed condition, the flow of the hydrogen is intercepted between a fuel pipe 29c of the downstream side of the primary regulator 23 and the MH tank 31. On the other hand, in the opened condition, the flow of hydrogen is permitted between the fuel pipe 29c and the MH tank 31. Although the third cutoff valve 32 is usually in the closed condition, the third cutoff valve 32 is in the opened condition when the heat is generated by supplying the hydrogen to the MH tank 31 and when the hydrogen is discharged from the MH tank 31 (when the hydrogen storage alloy is reproduced).

The three-way solenoid valve 33 is an electromagnetically driven flow path switching valve. The three-way solenoid valve 33 is operated based on the signal from the controller 60, and takes a first position for intercommunicating the cooling liquid pipe 39$b$ and the cooling liquid pipe 39$c$, and a second position for intercommunicating the cooling liquid pipe 39$h$ (bypass pipe) and the cooling liquid pipe 39$c$. When the three-way solenoid valve 33 is at the first position, the cooling liquid flows into the circulating pump 35 through the cooling liquid pipes 39$b$, 39$c$ after flowing into the MH tank 31 through the cooling liquid pipe 39$a$ from the fuel cell 10. When the three-way solenoid valve 33 is at the second position, the cooling liquid flows into the circulating pump 35 through the cooling liquid pipes 39$a$, 39$h$, 39$c$ from the fuel cell 10, and bypasses the MH tank 31.

The circulating pump 35 plays the role of a pump for circulating the cooling liquid of the primary cooling system C1 of the fuel cell 10. The cooling liquid circulates through the MH tank 31 (jacket part), the circulating pump 35, the thermostat valve TV (heat exchanger HE), and the fuel cell 10 in turn by the circulating pump 35.

The cooling liquid is obtained by adding a substance for lowering a freezing point (freeze temperature), such as ethylene glycol to pure water.

The electric heater 37 composing the reproduction heating system uses an electric double layer capacitor and a rechargeable battery (a nickel-hydrogen battery and a lithium ion battery or the like) (not shown) as a power supply. The electric heater 37 is started based on the signal from the controller 60 (heat is generated), and heats the MH tank 31 through the heat medium (in the embodiment; the cooling liquid of the primary cooling system C1). The electric heater 37 is a means capable of discharging (reproducing the hydrogen storage alloy) the hydrogen from the MH tank 31 even when an ignition switch is turned off during the warm-up of the fuel cell 10 (during the hydrogen introduction to the MH tank 31) or the like.

The auxiliary pump 38 uses the electric double layer capacitor and the rechargeable battery as well as the electric heater 37 as the power supply. The auxiliary pump 38 is started based on the signal from the controller 60, and the cooling liquid circulates between the MH tank 31 and the electric heater 37.

The liquid temperatures $T_{IN}$, $T_{OUT}$ of two places of the cooling liquid in the warm-up system 30 are detected by temperature sensors $T_{IN}$ (the inlet side of the MH tank 31) and $T_{OUT}$ (the outlet side of the MH tank 31), and the detected signals are transmitted to the controller 60. The internal pressure $P_{MH}$ of the MH tank 31 is detected by a pressure sensor $P_{MH}$, and the detected signal is transmitted to the controller 60.

The warm-up system 30 deprives the heat generated by the MH tank 31 to warm up the fuel cell 10. In addition, the warm-up system 30 plays the role of applying the heat generated by the fuel cell 10 to the MH tank 31 and urging the discharge of the hydrogen absorbed by the hydrogen storage alloy at the time of reproduction to be described below. This is because when the hydrogen storage alloy discharges the hydrogen, the hydrogen storage alloy absorbs the heat, and the hydrogen cannot be discharged. Since the cooling liquid is cooled by the MH tank 31 at the time of reproduction, the load of the primary cooling system C1 and the secondary cooling system C2 of the fuel cell 10 is reduced. That is, the cooling performance (capability) of the fuel cell 10 is improved at the time of reproduction.

The air supply system 40 plays the role of supplying air as an oxidizing agent gas to the fuel cell 10. Thereby, the air supply system 40 has an air compressor 41. The air compressor 41 is a supercharger or the like driven by a motor, and the revolution speed of the motor is controlled by the signal from the controller 60. In this way, if the revolution speed of the motor is increased, the amount of air supplied to the cathode electrode of the fuel cell 10 is increased. The air supplied to the fuel cell 10 is humidified by a humidifier (not shown). The off-gas discharged from the fuel cell 10 is discharged to the outside of the system after humidifying air which circulates the humidifier and is supplied to the fuel cell 10.

The power consumption system 50 comprises a VCU 51 and a load (a motor for driving a vehicle and a lamplight or the like) 52 as described above.

The controller 60 plays the role for setting the target generated amount of the fuel cell 10 based on the treading amount θth of a throttle pedal, the various pressures P, the various temperatures T and the amount of auxiliary machine power consumption. The controller 60 plays the role for setting the amount (the motor revolution speed of the air compressor 41) of the air supplied to the fuel cell 10 based on the target generated amount. The controller 60 plays the role for setting the amount of the hydrogen supplied to the fuel cell 10 from the MH tank 31 based on the target generated amount (proportional to the consumption amount of hydrogen) and the internal pressure $P_M$ of the MH tank 31. The controller 60 limits the target generated amount based on the state (operating temperature or the like) of the fuel cell 10, and plays the role for setting the extraction current amount from the fuel cell 10. The VCU 51 takes out current from the fuel cell 10 based on the extraction current amount.

<Starting Time Control>

Next, with reference to a flow chart shown in FIG. 6, the procedure for starting time control of the fuel cell in the embodiment will be explained in detail (see FIG. 5 as appropriate).

Figure 6:
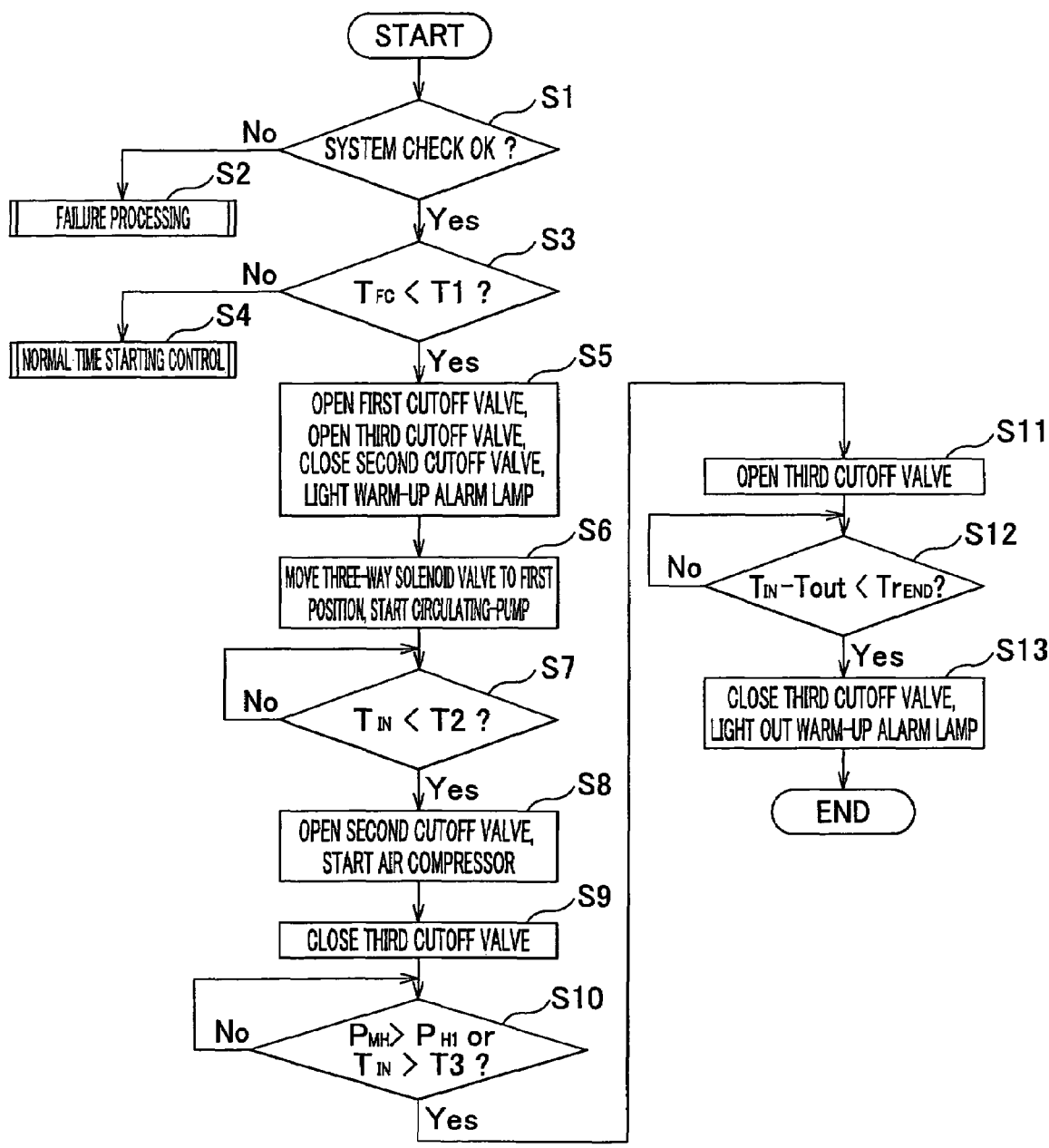
FIG. 6 is a flow chart showing the procedure of starting control in the embodiment.

When the ignition switch (not shown) of the vehicle V (see FIG. 4) is turned ON by a driver, the controller 60 executes the starting time control shown in FIG. 6. First, the controller 60 executes the system check of the fuel cell system F1 in Step S1. When the controller 60 determines that an abnormality exists in the system (No), it is made to move to failure processing of Step S2. When the controller 60 determines that no abnormality in Step S1 (Yes), the controller 60 determines whether the temperature $T_{FC}$ of the fuel cell 10 is lower than a warm-up demand temperature T1 (for example, 0° C.) in Step S3 or not. When it is determined that it is "No," it is made to move to normal starting time control in Step S4. The temperature $T_{FC}$ of the fuel cell 10 may be the liquid temperature $T_{IN}$ of the cooling liquid in the warm-up system 30, and may be the device temperature of the fuel cell 10 detected by a temperature sensor.

When the temperature $T_{FC}$ of the fuel cell 10 is lower than the warm-up demand temperature T1 and it is determined that it is "Yes" in Step S3, the controller 60 opens the first cutoff valve 22 and the third cutoff valve 32 in Step S5, closes the second cutoff valve 25, and lights a warm-up alarm lamp (not shown) provided on an instrument panel or the like.

Thereby, the hydrogen (hydrogen for warm-up) is supplied to the MH tank 31 from the high-pressure hydrogen tank 21 through the first cutoff valve 22, the primary regulator 23 and the third cutoff valve 32. Then, the internal pressure of the MH tank 31 is increased, and the hydrogen storage alloy absorbs the hydrogen, and generates heat. Although heat generation has rapidly occurred and the internal temperature of the MH tank 31 rises immediately, the temperature does not overshoot as described above (see FIG. 3). The driver can recognize that the fuel cell 10 is in a warm-up condition by the lighting of the warm-up alarm lamp. Since the second cutoff valve 25 is closed at this stage, the hydrogen is not supplied to the fuel cell 10.

Next, the controller 60 makes the three-way solenoid valve 33 move to the first position in Step S6, and starts the circulating pump 35 of the warm-up system 30 which serves as the cooling liquid circulating pump of the primary cooling system C1 of the fuel cell 10. Thereby, the heat generated by the MH tank 31 is supplied to the fuel cell 10 through the cooling liquid, and the temperature of the fuel cell 10 starts to rise promptly.

Next, the controller 60 determines whether the liquid temperature $T_{IN}$ (that is, the liquid temperature of the downstream side of the fuel cell 10) of the inlet side of the MH tank 31 exceeds an operation starting temperature T2 (for example, 30° C.) in Step S7 or not, and the controller 60 repeats the determination of Step S7 for every control interval while it is determined as being "No".

When the liquid temperature $T_{IN}$ of the inlet side of the MH tank 31 exceeds the operation starting temperature T2, and it is determined as being "Yes" in Step S7, the controller 60 opens the second cutoff valve 25 and starts the air compressor 41 in Step S8. Thereby, while the hydrogen is supplied to the anode electrode, air is supplied to the cathode electrode, and the fuel cell 10 starts operation (power generation). In this case, the secondary regulator 24 supplies the hydrogen adjusted to a pressure (for example, 0.5 MPa) according to the discharge pressure of the air compressor 41 to the fuel cell 10 in order to take the inlet pressure $P_C$ of the cathode electrode as pilot pressure. The target generated amount of the fuel cell 10 becomes an amount equivalent to the electricity consumed for the motor of the air compressor 41 and the drive of the auxiliary machines of the circulating pump 35 besides the treading amount θth (that is, the electricity consumed by the travel (the operation of a motor for travelling) of the vehicle V) of a throttle pedal. The amount (the motor revolution speed of the air compressor 41) of the air supplied to the fuel cell 10 increases as the target generated amount increases.

Next, the controller 60 closes the third cutoff valve 32 and shuts off communication between the MH tank 31 and the hydrogen pipe 36a in Step S9. Thereby, the supply of the hydrogen to the MH tank 31 is shut off, and the absorption of the hydrogen due to the hydrogen storage alloy stops. The temperature of the fuel cell 10 continues to rise to a predetermined temperature (for example, 80° C.) by the heat exchange with the MH tank 31 and self-generation accompanying the operation after the absorption of the hydrogen as a result of the hydrogen storage alloy stopping. The temperature of the MH tank 31 is balanced with the cooling liquid temperature of the fuel cell 10 after the heat generation accompanying the absorption of the hydrogen of the hydrogen storage alloy stops.

Next, the controller 60 determines whether the internal pressure $P_{MH}$ of the MH tank 31 exceeds the first adjusting pressure $P_{H1}$ or not, or whether the liquid temperature $T_{IN}$ (that is, the temperature of the fuel cell 10) of the inlet side of the MH tank 31 exceeds a reproduction start temperature T3 (for example, 50° C.) or not in Step S10. The controller 60 repeats the determination of Step S10 for every control interval while it is determined as being "No."

The internal pressure $P_{MH}$ of the MH tank 31 exceeds the first adjusting pressure $P_{H1}$, or the liquid temperature $T_{IN}$ of the inlet side of the MH tank 31 exceeds the reproduction start temperature T3 and it is determined as being "Yes" in Step S10, the controller 60 opens the third cutoff valve 32 in Step S11. Herein, the reproduction start temperature T3 in Step S10 is set to the temperature where the internal pressure $P_{MH}$ of the MH tank 31 will exceed the first adjusting pressure $P_{H1}$.

Then, the hydrogen absorbed by the hydrogen storage alloy is discharged from the MH tank 31, and the hydrogen flows into the fuel piping 29c through the hydrogen pipes 36b, 36a. The hydrogen flowing into the fuel pipe 29c flows into the fuel cell 10 through the secondary regulator 24, the second cutoff valve 25 and the ejector 26 with the hydrogen from the high-pressure hydrogen tank 21, and is consumed. When the hydrogen storage alloy discharges (reproduces) the hydrogen, the hydrogen storage alloy absorbs heat (the endothermic reaction is caused) However, since the heat due to the operation of the fuel cell 10 is supplied through the cooling liquid, reproduction is continued during the operation of the fuel cell 10.

That is, the high-pressure hydrogen tank decompressed to the first pressure is introduced into the hydrogen storage alloy tank at the time of the warm-up of the fuel cell, and the fuel cell is warmed up by the hydrogen absorption heat of the hydrogen storage alloy. The hydrogen storage alloy tank is heated by the heat generated with the operation (power generation) of the fuel cell at the time of reproduction of the hydrogen storage alloy, and the pressure in the hydrogen storage alloy tank is made to rise to a pressure higher than the first pressure, thereby discharging the hydrogen. Thus, the hydrogen pipe can be shared by setting the pressure of the hydrogen storage alloy tank to the first adjusting pressure $P_{H1}$ at the time of the warm-up of the fuel cell, and heating until the pressure of the hydrogen storage alloy tank becomes a pressure higher than the first adjusting pressure $P_{H1}$ at the time of reproduction of the hydrogen storage alloy, and the fuel cell system having a simple configuration can be provided.

After opening the third cutoff valve 32, the controller 60 determines whether the difference between the liquid temperature $T_{IN}$ of the inlet side of the MH tank 31 and the liquid temperature $T_{OUT}$ of the outlet side is smaller than a predetermined reproduction end threshold $Tr_{END}$ (for example, 1° C.) or not in Step S12, and repeats the determination of Step S12 for every control interval while it is determined as being "No." In the MH tank 31, the heat of cooling water from the fuel cell 10 is deprived by the endoergic reaction of the hydrogen storage alloy. However, when the reproduction advances and the hydrogen is not discharged, the endoergic reaction stops and there is no difference between the liquid temperature $T_{IN}$ of the inlet side of the MH tank 31 and the liquid temperature $T_{OUT}$ of the outlet side.

When the reproduction is completed and it is determined as being "Yes" in Step S12, the controller 60 closes the third cutoff valve 32 in Step S13, turns off the warm-up alarm lamp, and stops the starting time control.

Figure 7:
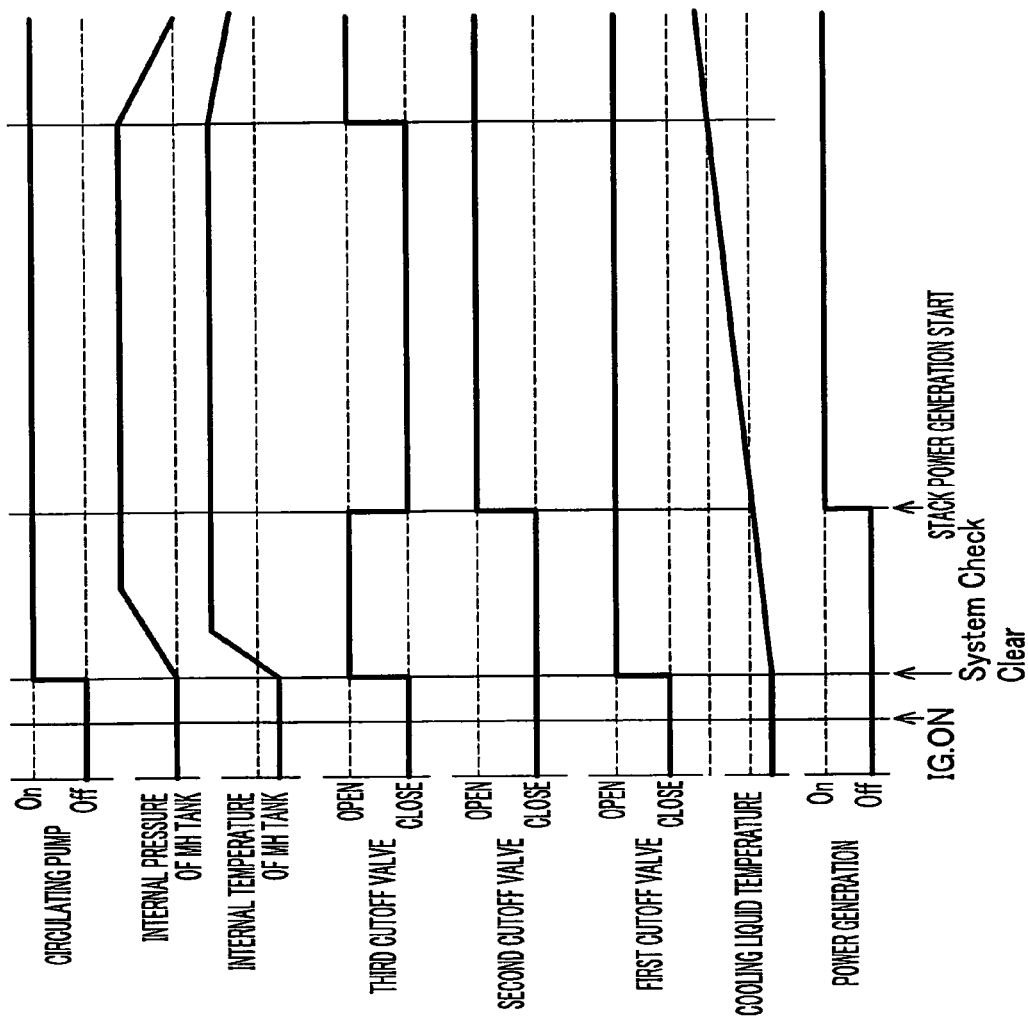
FIG. 7 is a control time chart in starting control in the embodiment.

Next, with reference to a time chart shown in FIG. 7, operation will be explained for starting time control of the fuel cell system F1 of the embodiment (see FIG. 5 as appropriate). FIG. 7 is a control time chart at the time of starting the fuel cell system F1.

Figure 4:
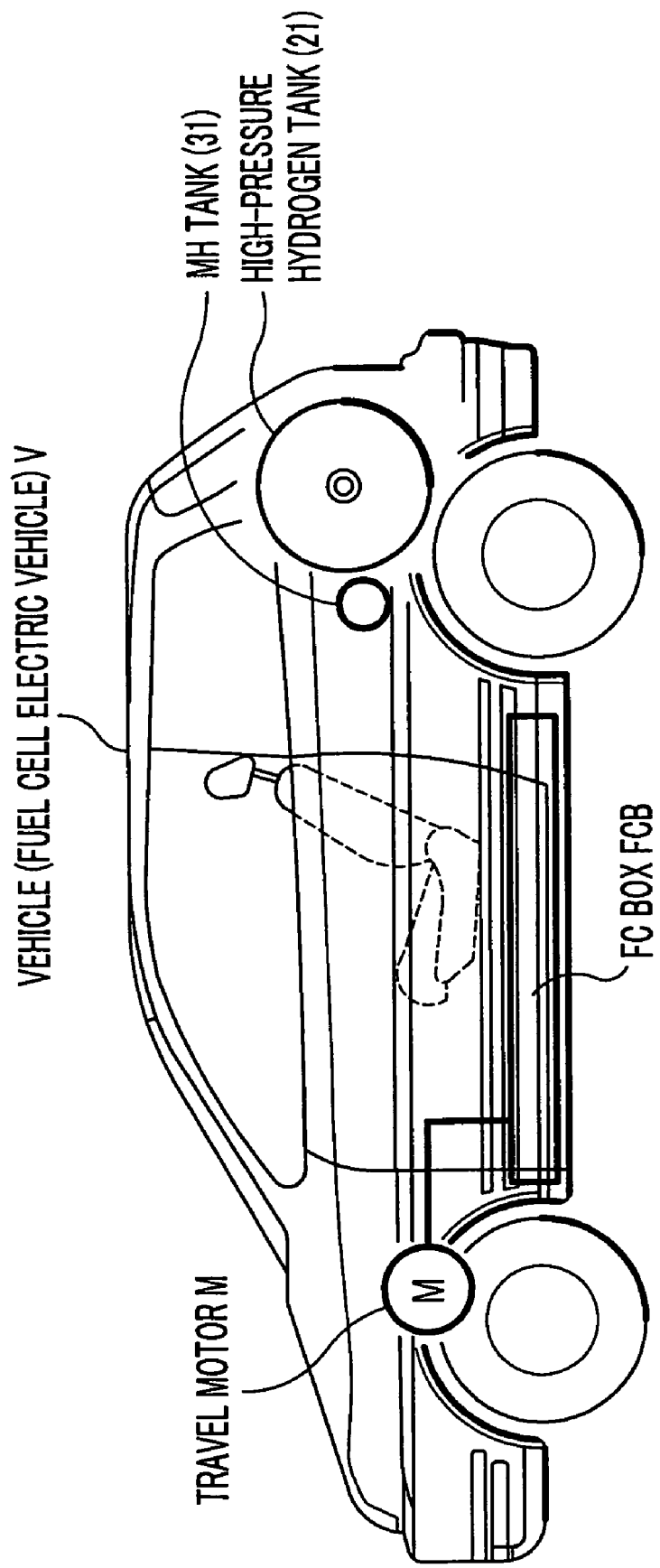
FIG. 4 is a partial perspective side view of a vehicle in which a fuel cell system of the embodiment according to the present invention is mounted.

The first cutoff valve 22, the second cutoff valve 25 and the third cutoff valve 32 are in the closed condition at the time of stop of the vehicle V (see FIG. 4). The circulating pump 35 stops. The cooling liquid temperature of the fuel cell 10 is 0° C. or less as a prescribed temperature for starting warm-up. The internal pressure of the MH tank 31 is about 0 kPa (gage pressure). Of course, the fuel cell 10 does not generate electricity.

The ignition switch of the vehicle V (see FIG. 4) from this state is set in an ON state. The control shown in FIG. 6 is executed, and when there is no abnormality in the system and the cooling liquid temperature is 0° C. or less, it is made to move to the warm-up of the fuel cell 10 (System Check Clear).

Then, the starting time control shown in FIG. 6 is executed. When the first cutoff valve 22 and the third cutoff valve 32 are opened and are set in the opened condition, the circulating pump 35 is simultaneously started. Thereby, the hydrogen is supplied to the MH tank 31, and the internal temperature and internal pressure of the MH tank 31 rise. The cooling liquid temperature rises and temperature-raised cooling liquid circulates through the warm-up system 30 (primary cooling system C1). Thereby, the heat generated by the MH tank 31 warms up the fuel cell 10. In the time chart shown in FIG. 7, power generation at this time (at the time of System Check Clear) is not performed. That is, the air compressor 41 is not started.

In this way, when the hydrogen is supplied to the MH tank 31, the temperature of the MH tank 31 reaches the highest temperature immediately, and a fixed temperature is then maintained. The internal pressure of the MH tank 31 is fixed to high pressure after a while. The warm-up is continued in the meantime.

In the time chart shown in FIG. 7, the first cutoff valve 22 is opened simultaneously with the completion of the warm-up, and the power generation due to the fuel cell 10 is started (Stack power generation start). The third cutoff valve 32 is simultaneously closed, and the third cutoff valve 32 is set in a closed condition. In this case, required auxiliary machines such as the air compressor 41 are started by using the electric double layer capacitor and rechargeable battery described above. Then, the hydrogen and oxygen are supplied to the fuel cell 10. When the voltage (open-circuit voltage) of the fuel cell 10 rises, the load current is taken out to the air compressor 41 or the like through the VCU 51. When the cooling liquid temperature reaches 50° C. as the reproduction start temperature, the third cutoff valve 32 is opened again and the hydrogen is started to be discharged from the hydrogen storage alloy.

Thus, the fuel cell 10 can be reliably warmed up by using the heat generated when the hydrogen storage alloy absorbs the hydrogen according to the embodiment. In addition, the hydrogen absorbed by the hydrogen storage alloy is discharged after the warm-up, and can be supplied for power generation as fuel gas. The warm-up can be performed at a low temperature next time by making the hydrogen storage alloy discharge the hydrogen. Since the fuel cell 10 generates electricity while warming up, the fuel cell 10 also self-heats, and thereby, the warm-up is quickly performed. Since the hydrogen is supplied to the MH tank 31 from the high-pressure hydrogen tank 21, the high-pressure hydrogen tank 21 is filled up with hydrogen for warm-up if the high-pressure hydrogen tank 21 is filled up with hydrogen, and the necessity for providing a hydrogen tank only for warm-up is eliminated.

Herein, the temperature of the MH tank 31 depends on the temperature-pressure characteristic (the internal temperature-pressure characteristic diagram of the MH tank 31; see FIG. 2) of the hydrogen storage alloy. If the kind of the hydrogen storage alloy and the applied pressure of the hydrogen are the same, the generation of heat is proportional to the amount of the hydrogen storage alloy. Therefore, the characteristic of the MH tank 31 (a so-called, hydrogen storage heat type heater (MH heater)) can be freely set by making the kind of the hydrogen storage alloy, the pressure of the hydrogen applied to the MH tank 31 and the amount of the hydrogen storage alloy as parameters. On the other hand, when the hydrogen absorbed is discharged, the discharged amount and absorbed amount can be freely controlled by making the kind, pressure and temperature of the hydrogen storage alloy as parameters.

Furthermore, even if the internal pressure of the MH tank 31 is raised without any restriction, the absorption amount of the hydrogen storage alloy (the storage amount of the hydrogen) is not excessively increased. However, the wall thickness of the MH tank 31 must be thickened in order to raise pressure tightness. In this case, it is difficult to take out the heat generated in the MH tank 31, and the weight of the MH tank 31 increases simultaneously. When the hydrogen absorbed by the hydrogen storage alloy is discharged, if the wall thickness becomes thick, it is difficult to supply the heat to the inside of the MH tank 31. From these respects, if the internal pressure (storage pressure) of the MH tank 31 is 1 to 5 Mpa (or 1 to 3 MPa), the hydrogen can be efficiently absorbed, and it is not necessary to make the wall thickness of the MH tank 31 thick beyond necessity. Thereby, it is preferable from a point of heat transmission and weight.

<Emergency Reproduction Control>

Next, at the time when the driver changes the ignition switch over to an OFF state during the warm-up of the fuel cell 10 or during the reproduction of the hydrogen storage alloy, the procedure for control for reproducing the hydrogen storage alloy will be described.

Figure 8:
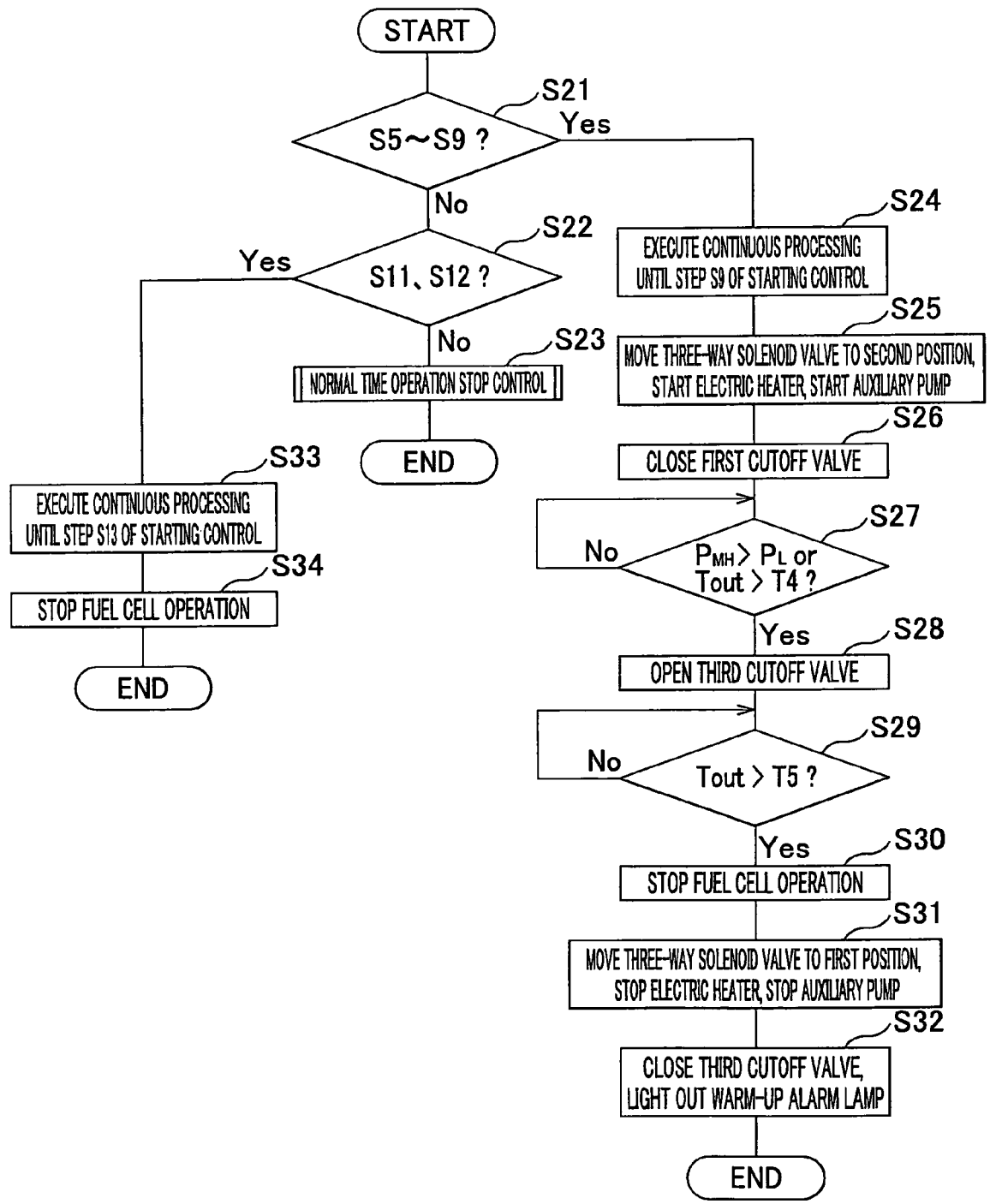
FIG. 8 is a flow chart showing the procedure of emergency reproduction control in the embodiment.

The controller 60 executes emergency reproduction control in the flow chart shown in FIG. 8 in parallel to the starting time control. This control is a so-called interruption control, and is started by changing the ignition switch over to an OFF state during the warm-up (Step S5 to Step S9 of the starting time control) or during the reproduction (Step S11 of the starting time control or Step S12).

When the emergency reproduction control is started, first, the controller 60 determines whether any one of Step S5 to Step S9 of the starting time control is being processed at the present time or not in Step S21 shown in FIG. 8. If it is determined as being "No," next, the controller 60 determines whether Step S11 of the starting time control at the present time or Step S11 is being processed or not in Step S22. If it is also determined as being "No," the controller 60 determines that the ignition switch is changed over to an OFF state before the warm-up start or after the reproduction end, and it is made to move to the normal time operation stop control.

After the driver changes the ignition switch over to an ON state, when the driver stops the operation of the vehicle V before travel start, and changes the ignition switch over to an OFF state, or changes the ignition switch over to an OFF state after traveling for a short time, it is determined as being "Yes" in Step S21 or in Step S22.

If it is determined as being "Yes" in Step S21, first, the controller 60 continuously executes the processing until Step S9 in the starting time control in Step S24. The controller 60 starts the operation of the fuel cell 10 and stops the introduction of the hydrogen to the MH tank 31.

Next, the controller 60 makes the three-way solenoid valve 33 move to the second position in Step S25, and starts the electric heater 37 and the auxiliary pump 38. Thereby, the cooling liquid supplied from the fuel cell 10 flows (is bypassed) into the circulating pump 35 through the cooling liquid pipes 39a, 39b, 39c, and the heat exchange between the fuel cell 10 and the MH tank 31 is stopped. The cooling liquid heated by the electric heater 37 is flowed into MH tank 31 by the auxiliary pump 38, and thereby the temperature of the MH tank 31 rises. Herein, the reason for stopping the heat exchange between the fuel cell 10 and the MH tank 31 is that the time required for the consumption increase and reproduction of electric energy is prevented from increasing by heating the whole cooling liquid of the primary cooling system C1 using the electric heater 37.

Next, the controller 60 closes the first cutoff valve 22 in Step S26, and stops supply of hydrogen to the hydrogen supply line from the high-pressure hydrogen tank 21. Thereby, in the fuel cell system F1, the fuel cell 10 continues low load operation (the operation for providing the electricity of the motor of the air compressor 41 and circulating pump 35 or the like) in the state where there is no new hydrogen supply from the high-pressure hydrogen tank 21. As a result, the pressure of the hydrogen supply line including the fuel pipe 29c of the downstream side of the primary regulator 23 is quickly reduced.

Next, in Step S27, the controller 60 determines whether the internal pressure $P_{MH}$ of the MH tank 31 exceeds an emergency reproduction start pressure $P_L$ (for example, 0.3 MPa) or not, or whether the liquid temperature $T_{out}$ of the outlet side of the MH tank 31 exceeds an emergency reproduction start temperature T4 (for example, 30° C.) or not. While it is determined as being "No," the controller 60 repeats the determination of Step S27 for every control interval. The emergency reproduction start temperature T4 is a temperature where the discharge plateau pressure of the hydrogen storage alloy becomes the emergency reproduction start pressure $P_L$.

When the internal pressure $P_{MH}$ of the MH tank 31 exceeds the emergency reproduction start pressure $P_L$ by the heat of the electric heater 37, or the liquid temperature $T_{out}$ of the outlet side of the MH tank 31 exceeds the emergency reproduction start temperature T4, and it is determined as being "Yes" in Step S27, the controller 60 opens the third cutoff valve 32 in Step S28.

Thereby, the hydrogen absorbed in the hydrogen storage alloy is discharged from the MH tank 31, and the hydrogen flows into the fuel pipe 29e through the hydrogen pipes 36b, 36a. The hydrogen flowing into the fuel pipe 29c flows into the fuel cell 10 through the secondary regulator 24, the second cutoff valve 25 and the ejector 26, and is consumed. When the hydrogen storage alloy discharges the hydrogen, the hydrogen storage alloy absorbs heat. However, since the heat is supplied to the MH tank 31 from the electric heater 37 through the cooling liquid, the hydrogen is continuously discharged (reproduction of the hydrogen storage alloy).

Next, in Step S29, the controller 60 determines whether the liquid temperature $T_{out}$ of the outlet side of the MH tank 31 exceeds an emergency reproduction end temperature T5 (for example, 40° C.). While it is determined as being "No," the controller 60 repeats the determination of Step S29 for every control interval. The emergency reproduction end temperature T5 is a temperature where the hydrogen storage alloy stops the discharge of the hydrogen under the emergency reproduction start pressure $P_L$.

If the liquid temperature $T_{out}$ of the outlet side of the MH tank 31 exceeds the emergency reproduction end temperature T5 and it is determined as being "Yes," first, the controller 60 stops the operation of the fuel cell 10 in Step S30. Next, while the controller 60 makes the three-way solenoid valve move to the first position in Step S31, the controller 60 stops the electric heater 37 and the auxiliary pump 38. Next, the controller 60 closes the third cutoff valve 32 in Step S32, turns off the above warm-up alarm lamp and stops the emergency reproduction control.

On the other hand, when it is determined as being "Yes" in the above step S22, the controller 60 continuously executes processing until Step S13 in the starting time control in Step S33. Then, the controller 60 stops the operation of the fuel cell 10 in Step S34, and stops the emergency reproduction control. In this case, since the temperature of the fuel cell 10 is sufficiently high, the hydrogen storage alloy can be reproduced in the MH tank 31, without heating by using the electric heater 37.

Figure 9:
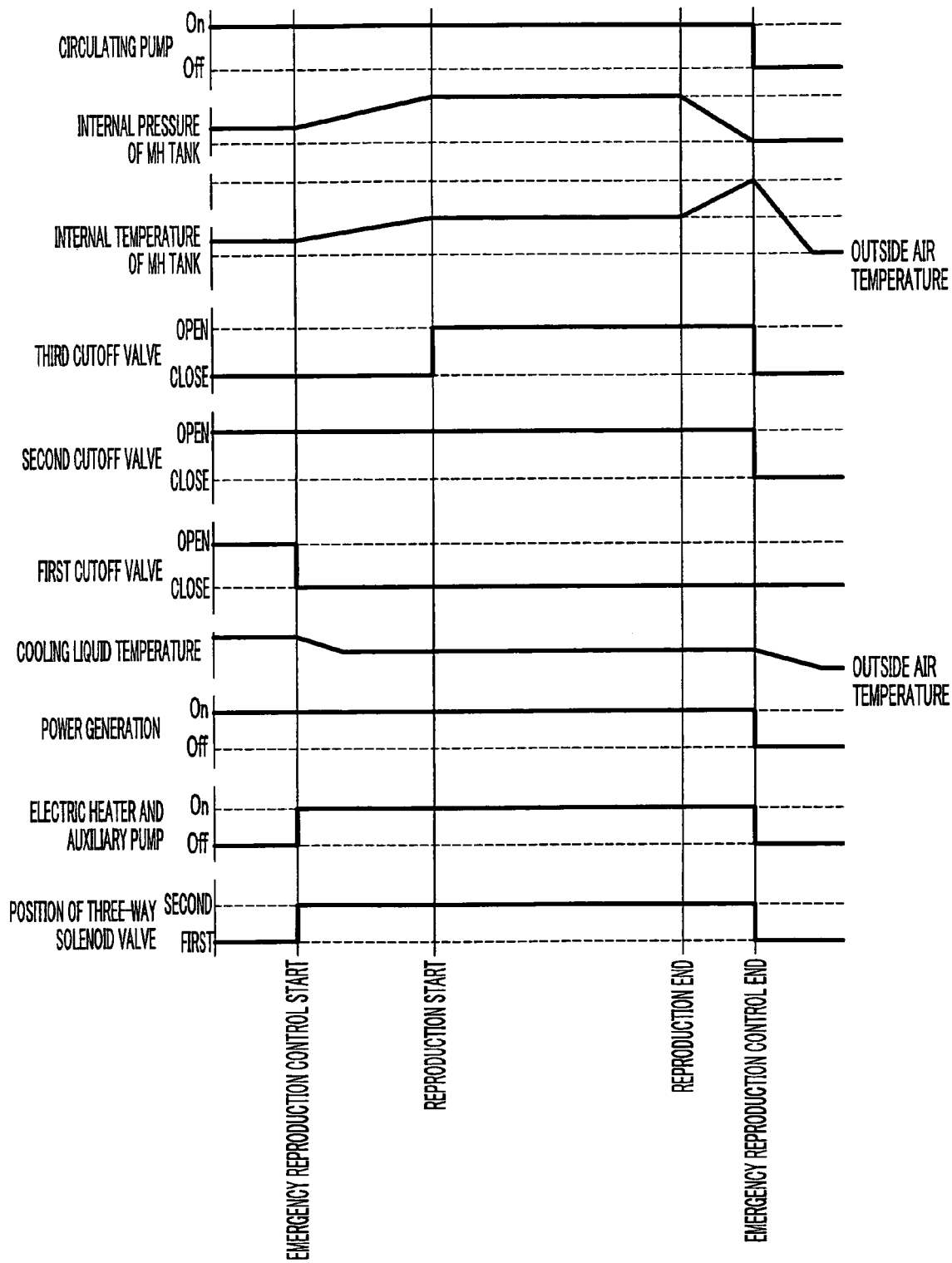
FIG. 9 is a time chart in emergency reproduction control in the embodiment.

Next, with reference to the time chart shown in FIG. 9, the operation (Step S25 or later) in the emergency reproduction control of the fuel cell system F1 of the embodiment will be explained (see FIG. 5 as appropriate). FIG. 9 is a control time chart in the emergency reproduction control of the fuel cell system F1.

When the driver changes the ignition switch over to an OFF state during the warm-up of the fuel cell 10, the controller 60 continuously executes processing until Step S9 in the starting time control. The fuel cell 10 is in operation at the time of stopping processing until Step S9, and the hydrogen storage alloy existing in the MH tank 31 finishes the absorption of the hydrogen.

When the emergency reproduction control of Step S26 is started from this state, the cooling liquid heated by the electric heater 37 flows into the MH tank 31, and the internal temperature and internal pressure of MH tank 31 begins to rise. The first cutoff valve 22 is closed, and thereby, the fuel cell 10 is in low load operation. The cooling liquid temperature of the primary cooling system C1 is reduced.

When the internal pressure $P_{MH}$ of the MH tank 31 exceeds the emergency reproduction start pressure $P_L$ (or the liquid temperature $T_{out}$ of the outlet side of the MH tank 31 exceeds the emergency reproduction start temperature T4), the third cutoff valve 32 is opened, and the hydrogen storage alloy starts the reproduction (the discharge of the hydrogen). The hydrogen storage alloy does not absorb the heat supplied from the electric heater 37 after the hydrogen storage alloy finishes the discharge of the hydrogen absorbed.

Accordingly, the internal temperature of the MH tank 31 rises exceeding the emergency reproduction end temperature T5, and the operation stop of the fuel cell 10, the stop of the electric heater 37 and auxiliary pump 38, the close of the third cutoff valve 32 or the like are performed. Thereby, the emergency reproduction control is completed. Thereby, the internal temperature of the cooling liquid temperature and the MH tank 31 becomes low to outside air temperature.

Thus, even if the ignition switch is changed over to an OFF state during the warm-up of the fuel cell 10 or during the reproduction of the hydrogen storage alloy in the embodiment, the hydrogen storage alloy is reproduced, and thereby, the calorific value in the case of the next warm-up can be reliably secured.

The present invention is not limited to the examples presented in the embodiments explained above and various changes can be made therein. For example, although the example of the PEM type fuel cell 10 is explained in the embodiment, the fuel cell is not limited to the PEM type. Although the example of the fuel cell electric vehicle is explained, the invention is applicable to a fuel cell system for ships and fixed generating facilities or the like. Though the fuel cell is warmed up by heating the cooling liquid of the fuel cell 10 in the embodiment, the fuel cell may be warmed up by warming fuel gas and/or air and by using the cooling liquid as the heat medium. The fuel cell 10 may be warmed up by introducing the heat generated when the hydrogen storage alloy absorbs the hydrogen into the FC box FCB (see FIG. 4) and by warming up the FC box FCB. Though the MH tank 31 is mounted in the rear of vehicle V, the MH tank 31 may be mounted in the FC box FCB. The fuel gas and/or the air may be warmed, and the fuel cell may be warmed up by using the fuel gas and/or air warmed up as the heat medium. A plurality of sets of hydrogen pipes are provided, and a route for introducing the hydrogen to the MH tank 31 from the hydrogen supply line may be separated from a route for discharging the hydrogen to the hydrogen supply line from the MH tank 31.

The electric heater 37 may heat the fuel cell 10 through the heat medium other than the cooling liquid, and may be laid underground in the MH tank 31. The cooling liquid channel between the fuel cell 10 and the MH tank 31 in the emergency reproduction control may be switched by a switching means other than the three-way solenoid valve, and the cooling liquid pipe may not be switched. The installation site of the pressure sensor and the temperature sensor in the hydrogen supply line, the hydrogen pipe and the cooling liquid pipe may be suitably changed or added according to the specific method of the starting time control and emergency reproduction control. The determination threshold of pressure or temperature in the starting time control and in the emergency reproduction control depends on the characteristic or the like of the hydrogen storage alloy, and can be suitably set without limitations to the exemplification in the embodiment.

What is claimed is:

1. A fuel cell system comprising:
    a high-pressure hydrogen tank storing high pressure hydrogen;
    a fuel cell consuming the hydrogen stored in the high-pressure hydrogen tank as fuel gas;
    a hydrogen supply line connecting the high-pressure hydrogen tank to the fuel cell;
    a primary decompressing means provided on the hydrogen supply line and decompressing the hydrogen to a first prescribed pressure;
    a secondary decompressing means provided in the downstream side of the primary decompressing means on the hydrogen supply line, and decompressing the hydrogen decompressed to a first prescribed pressure to a second prescribed pressure;
    a hydrogen pipe connected between the primary decompressing means and the secondary decompressing means on the hydrogen supply line, and is used for hydrogen transfer between the hydrogen supply line and the hydrogen storage alloy tank;
    a hydrogen storage alloy tank composed from a hydrogen storage alloy and thermal-exchangeably connected to the fuel cell; and
    a controlling means for introducing the hydrogen of the first prescribed pressure into the hydrogen storage alloy tank from the hydrogen supply line through the hydrogen pipe during the warm-up of the fuel cell, and for releasing hydrogen having a pressure higher than the first prescribed pressure to the hydrogen supply line from the hydrogen storage alloy tank through the hydrogen pipe after the warm-up of the fuel cell.

2. The fuel cell system according to claim 1, wherein the heat exchange between the hydrogen storage alloy tank and the fuel cell is carried out through a cooling liquid supplied for the cooling of the fuel cell.

3. The fuel cell system according to claim 1, wherein the fuel cell is warmed up when the temperature of the fuel cell is below a prescribed temperature.

4. The fuel cell system according to claim 2, wherein the fuel cell is warmed up when the temperature of the fuel cell is below a prescribed temperature.

5. The fuel cell system according to claim 3, further comprising:
    a heating means for heating the hydrogen storage alloy tank.

6. The fuel cell system according to claim 4, further comprising:
    a heating means for heating the hydrogen storage alloy tank.

7. The fuel cell system according to claim 5, wherein
    the heat generated when the hydrogen storage alloy absorbs the hydrogen is used for the heat exchange with the fuel cell.

8. The fuel cell system according to claim 6, wherein
    the heat generated when the hydrogen storage alloy absorbs the hydrogen is used for the heat exchange with the fuel cell.

9. The fuel cell system according to claim 7, wherein
    the controlling means adjusts the generation of the heat from the hydrogen storage alloy tank by controlling the first prescribed pressure of the hydrogen to be introduced into the hydrogen storage alloy tank.

10. The fuel cell system according to claim 8, wherein
    the controlling means adjusts the generation of the heat from the hydrogen storage alloy tank by controlling the first prescribed pressure of the hydrogen to be introduced into the hydrogen storage alloy tank.

11. A vehicle equipped with the fuel cell system of claim 1.

* * * * *